(12) United States Patent
Liu et al.

(10) Patent No.: US 11,500,648 B2
(45) Date of Patent: Nov. 15, 2022

(54) METHOD FOR FAST BOOTING PROCESSORS IN A MULTI-PROCESSOR ARCHITECTURE

(71) Applicant: LENOVO ENTERPRISE SOLUTIONS (SINGAPORE) PTE. LTD., Singapore (SG)

(72) Inventors: Zhijun Liu, Shanghai (CN); Chekim Chhuor, Shanghai (CN); Wen Wei Tang, Shanghai (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 87 days.

(21) Appl. No.: 16/544,268

(22) Filed: Aug. 19, 2019

(65) Prior Publication Data

US 2020/0057656 A1 Feb. 20, 2020

(30) Foreign Application Priority Data

Aug. 20, 2018 (CN) .......................... 201810948226.2

(51) Int. Cl.
*G06F 9/4401* (2018.01)
*G06F 21/44* (2013.01)

(52) U.S. Cl.
CPC ............ *G06F 9/4411* (2013.01); *G06F 21/44* (2013.01)

(58) Field of Classification Search
CPC .......... G06F 8/65; G06F 8/654; G06F 9/4401; G06F 3/0679; G06F 12/0246; G06F 21/572; G06F 11/1433; G06F 21/575; G06F 9/4403; G06F 11/1417; G06F 2212/1032; G06F 3/0607; G06F 8/60
USPC .................................................. 713/2, 1, 100
See application file for complete search history.

(56) References Cited

U.S. PATENT DOCUMENTS

| | | | | |
|---|---|---|---|---|
| 6,567,897 B2* | 5/2003 | Lee | ...................... | G06F 12/1441 711/152 |
| 7,908,470 B1* | 3/2011 | Cavanna | ............... | G06F 9/4405 713/2 |
| 7,971,098 B2* | 6/2011 | Tra | ........................ | G06F 9/4405 714/36 |
| 8,590,040 B2* | 11/2013 | Ghetie | ................... | G06F 21/572 726/22 |
| 9,781,015 B2* | 10/2017 | Schumacher | ....... | G06F 11/0751 |
| 10,146,942 B2* | 12/2018 | Martinez | ............... | G06F 21/572 |
| 2001/0042243 A1* | 11/2001 | Fish | ...................... | G06F 9/4401 717/149 |
| 2003/0028766 A1* | 2/2003 | Gass | ..................... | G06F 21/572 713/193 |

(Continued)

*Primary Examiner* — Faisal M Zaman

(57) ABSTRACT

A method for preparing fast boot of an information handling apparatus. The information handling apparatus contains a first CPU configured to connect to a storage device storing firmware and a second CPU connected to the first CPU. The method contains the steps of: allocating a firmware region in memories associated with each one of the first and second CPUs respectively; and copying a firmware from a storage device to the firmware region of each one of the memories. By utilizing a system memory such as NVDIMM which provides higher access speed than NAND flash and also persistent data storage, one or more CPUs can be booted from firmware images in the NVDIMM much faster, thus saving the total booting time.

17 Claims, 6 Drawing Sheets

(56) References Cited

U.S. PATENT DOCUMENTS

| | | | |
|---|---|---|---|
| 2003/0061540 A1* | 3/2003 | Lee | G06F 11/263 714/31 |
| 2004/0268105 A1* | 12/2004 | Michaelis | G06F 15/177 713/1 |
| 2006/0031666 A1* | 2/2006 | Yasuda | G06F 8/65 713/2 |
| 2007/0038801 A1* | 2/2007 | Tanaka | G06F 8/65 711/103 |
| 2007/0067614 A1* | 3/2007 | Berry | H04L 67/34 713/1 |
| 2008/0127159 A1* | 5/2008 | Regenmorter | G06F 8/65 717/168 |
| 2008/0256526 A1* | 10/2008 | Ellsworth | G06F 11/1658 717/168 |
| 2009/0193212 A1* | 7/2009 | Kodaka | G06F 12/0223 711/170 |
| 2009/0241103 A1* | 9/2009 | Pennisi | G06F 8/65 717/173 |
| 2009/0271601 A1* | 10/2009 | Zimmer | G06F 9/4405 713/2 |
| 2011/0320683 A1* | 12/2011 | Ueki | G06F 11/1441 711/102 |
| 2013/0262849 A1* | 10/2013 | Redheendran | G06F 9/44505 713/100 |
| 2015/0074387 A1* | 3/2015 | Lewis | G06F 21/575 713/2 |
| 2015/0277932 A1* | 10/2015 | Fukumori | G06F 9/4401 713/2 |
| 2016/0182238 A1* | 6/2016 | Dewan | H04L 9/321 713/193 |
| 2017/0315912 A1* | 11/2017 | Wright | G06F 12/0623 |
| 2017/0364365 A1* | 12/2017 | Warkentin | G06F 9/4405 |
| 2018/0024838 A1* | 1/2018 | Nachimuthu | H04Q 1/09 713/1 |
| 2018/0067799 A1* | 3/2018 | Genshaft | G06F 11/1068 |
| 2018/0081547 A1* | 3/2018 | Long | G06F 3/0604 |
| 2018/0322012 A1* | 11/2018 | Sharma | G06F 11/1451 |
| 2018/0349607 A1* | 12/2018 | Khatri | G06F 21/575 |
| 2019/0095623 A1* | 3/2019 | Narasimhan | G06F 21/44 |
| 2019/0121982 A1* | 4/2019 | Wotherspoon | G06Q 20/18 |
| 2022/0069988 A1* | 3/2022 | Ong | G06F 21/575 |

* cited by examiner

METHOD FOR FAST BOOTING PROCESSORS IN A MULTI-PROCESSOR ARCHITECTURE

CROSS-REFERENCE TO RELATED APPLICATION

This application claims priority under 35 U.S.C § 119 to Chinese Patent Application No. 201810948226.2, filed Aug. 20, 2018, the entire text of which is specifically incorporated by reference herein.

TECHNICAL FIELD

The present invention relates to processors in computing devices, and in particular to booting up of processors in computing devices.

DESCRIPTION OF THE RELATED ART

Modern servers in computer networks are often equipped with multiple processors, which work together to complete computationally complex tasks. The multiple processors are installed in multiple sockets on a mainboard of the server, and the multiple sockets provide a flexibility in the number of processors installed (e.g. 2, 4, or 8). In addition, each of the processors may also be multi-core and/or multiple threads, meaning that the processor has more than one logical CPU core which can physically execute multiple instructions at the same time, and which supports a program to run on more than one core at the same time.

In conventional designs of circuits of computing devices, the multiple processors are connected to a Platform Controller Hub (PCH) through a Direct Media Interface (DMI) bus group, and in particular a first CPU is connected to the PCH through the DMI bus. Such a configuration can be found for example in servers based on Intel® Xeon® processors. On the other hand, a firmware of the computing device, for example Unified Extensible Firmware Interface (UEFI), is typically stored on a Serial Peripheral Interface (SPI) flash chip that connects to the PCH. There is only one SPI flash which connects to the PCH.

There is a limitation in the booting performance of such a system since with the sole SPI flash, only the first processor and a next processor which directly connects to the first processor can fetch from the SPI flash directly the firmware image for booting up. Other non-direct-connected processors need the first processor to configure the Quick Path Interconnect (QPI)/Ultra Path Interconnect (UPI) links and reboot, then fetch the firmware image through the first processor. This severely delayed the booting process of the multiple processors in the computing device.

SUMMARY

Accordingly, the present invention, in one aspect, is a method for preparing fast boot of an information handling apparatus. The information handling apparatus contains a first CPU connected to a firmware reservoir and a second CPU connected to the first CPU. The method contains the steps of: allocating a firmware region in memories associated with each one of the first and second CPUs respectively; and copying a firmware from the firmware reservoir to the firmware region of each one of the memories.

In another aspect of the invention, there is provided a method of booting an information handling apparatus. The information handling apparatus contains a first CPU connected to a firmware reservoir and a second CPU connected to the first CPU. The method contains the steps of: a) determining whether a firmware in a firmware reservoir is stored in a firmware region in memories associated with each one of the first and second CPUs respectively; b) booting the first CPU or the second CPU from the memories associated with the first CPU or the second CPU respectively, if it is determined that the firmware is stored in the firmware region in memories associated with the first CPU or the second CPU respectively; and c) booting the first CPU or the second CPU from the firmware reservoir if it is determined that there is no said firmware stored in the firmware region in the memories associated with the first CPU or the second CPU respectively, and also copying a firmware from the firmware reservoir to the firmware region of the respective memory.

According to a further aspect of the invention, there is disclosed an information handling apparatus including a first CPU connected to a firmware reservoir; a second CPU connected to the first CPU; memories associated with each one of the first and second CPUs respectively. The first CPU is operable to implement a method comprising allocating a firmware region in the memories associated with each one of the first and second CPUs respectively. The first CPU and the second CPU are further operable to implement a method comprising copying a firmware from the firmware reservoir to the firmware region of each one of the memories.

According to a further aspect of the invention, an information handling apparatus containing a first CPU connected to a firmware reservoir; a second CPU connected to the first CPU; memories associated with each one of the first and second CPUs respectively. The first CPU is operable to implement a method comprising determining whether a firmware in a firmware reservoir is stored in a firmware region in memories associated with each one of the first and second CPUs respectively. The first CPU or the second CPU are adapted to be booted from the memories associated with the first CPU or the second CPU respectively, if it is determined that the firmware is stored in the firmware region in memories associated with the first CPU or the second CPU respectively. The first CPU or the second CPU further are adapted to be booted from the firmware reservoir if it is determined that there is no said firmware stored in the firmware region in the memories associated with the first CPU or the second CPU respectively, and copying a firmware from the firmware reservoir to the firmware region of the respective memory.

The present invention therefore provides an improved booting performance for multi-processors computing devices. The difference in the booting time between conventional devices and devices in present invention is more significant when the number of processors in the device increases, e.g. a 8 s glue-less system. Such improvement in booting time is because of the present invention making use of main memory of the system for storing firmware image which provides a much faster access speed (in other words smaller latency) than the flash chip storing the firmware. In addition, the persistent memory regions in the main memory can have passphrase to protect integrity of the firmware image in the regions, so that unauthorized modification to the regions can be avoided.

BRIEF DESCRIPTION OF DRAWINGS

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION

Figure 1:
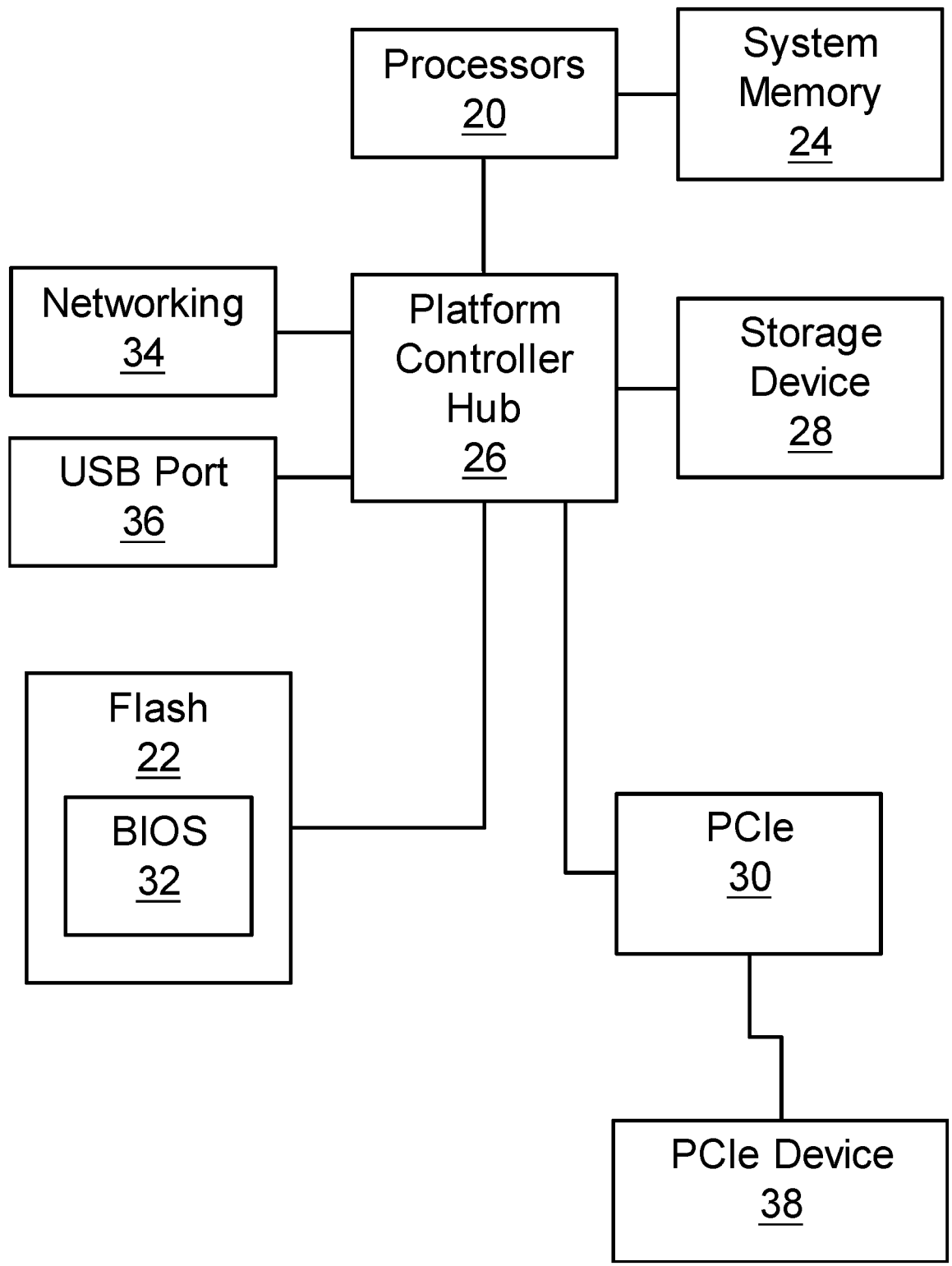
FIG. 1 shows a system according to different embodiments of the present invention.

FIG. 1 shows a system according to different embodiments of the present invention. As shown in FIG. 1, the PCH 26 is connected to multiple processors 20, a storage device 28, a peripheral component interconnect express (PCIe) bus 30, flash storage 22, a universal serial bus (USB) port 36, and a networking connection 34. The processors 20 are connected to a system memory 24. The PCIe bus 30 is connected to a PCIe device 38. The flash storage 22 includes a basic input/output system (BIOS) 32.

Figure 2A:
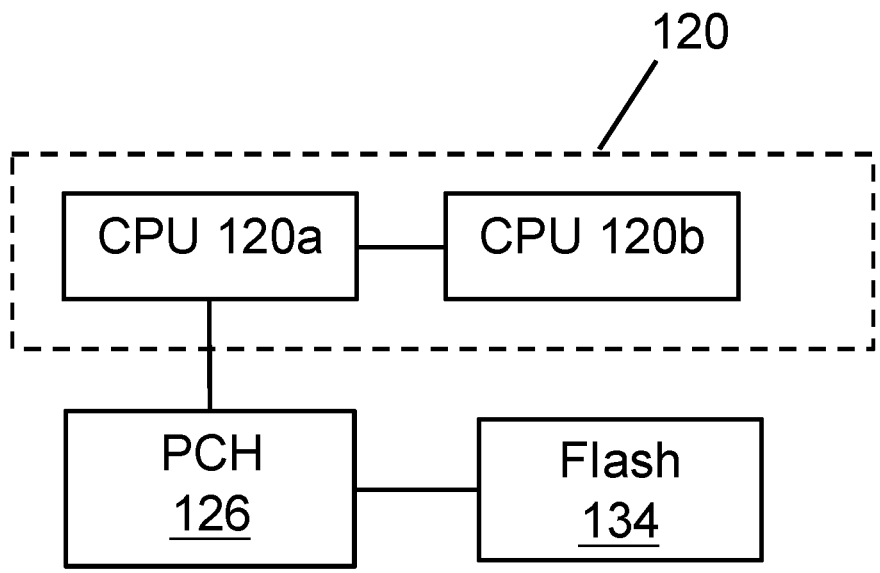
FIGS. 2a-2c show respectively the architectures of 2 s, 4s and 8 s multi-processor configurations in computing devices according to different embodiments of the present invention.
Figure 2B:
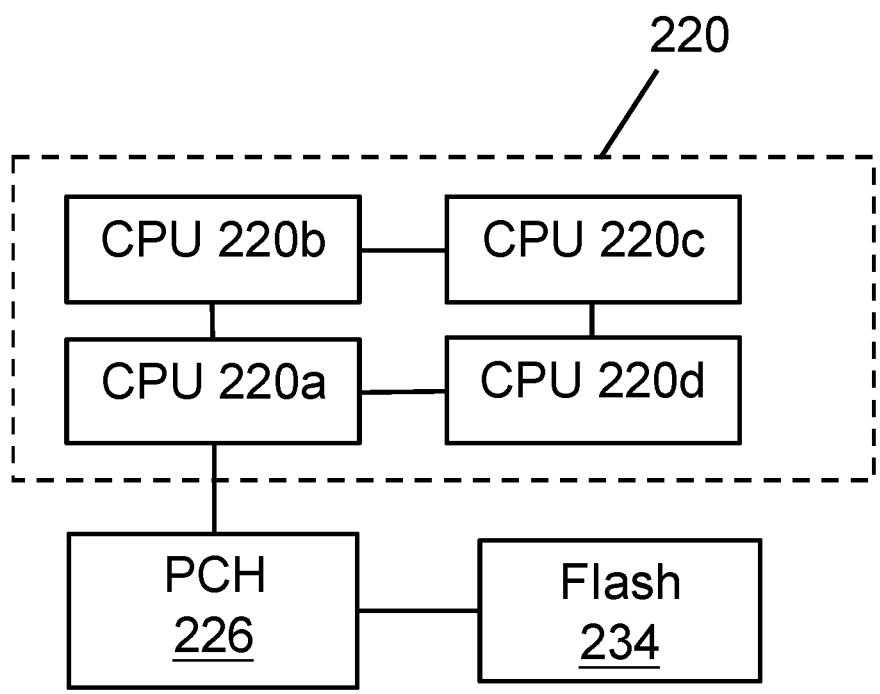
Figure 2C:
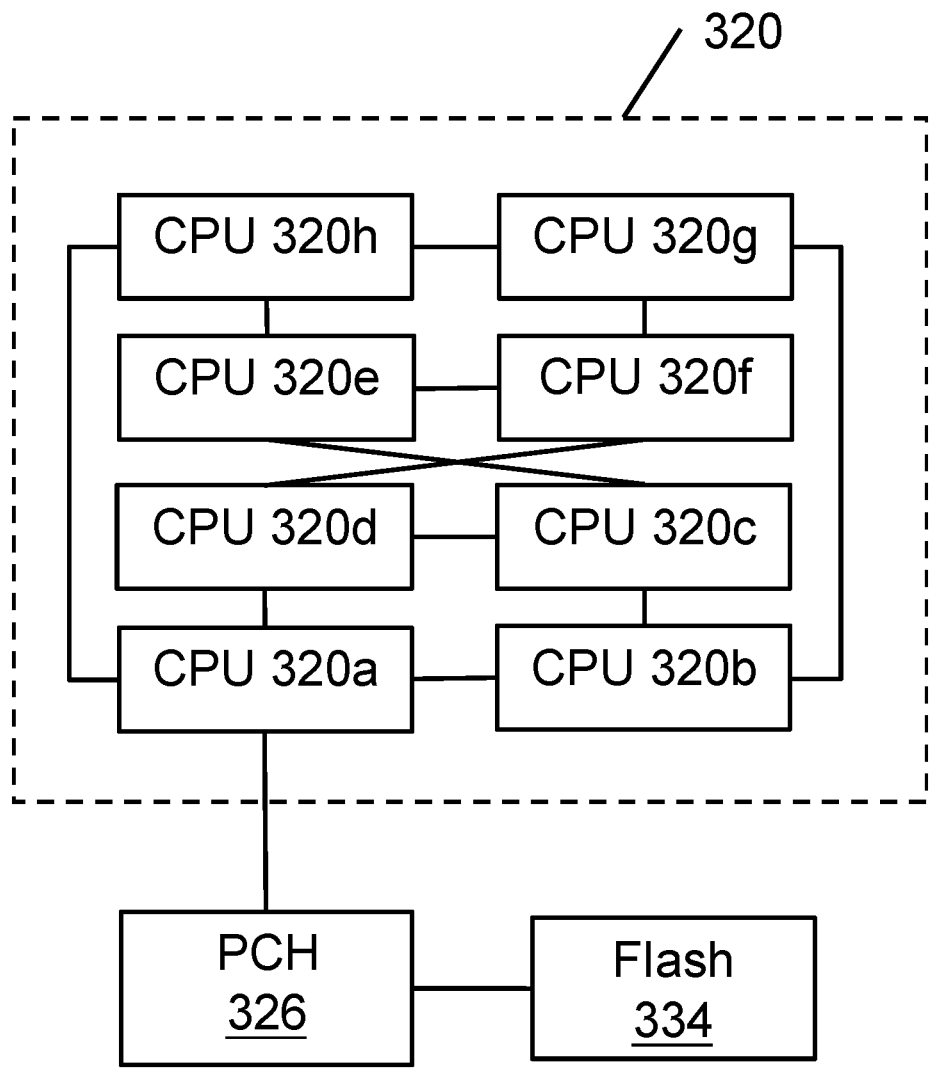

Turning now to FIG. 2a-2c, which show connections of multiple CPUs to the PCH and the flash chip according to three embodiments of the invention Such configurations shown in FIGS. 2a-2c can be applied to any sort of information handling apparatus. In FIG. 2a, there are shown a first CPU 120a directly connected to a PCH 126 through DMI channel, and a second CPU 120b connected to CPU 120a but not directly to the PCH 126 and a flash 134. The flash 134 connects to the PCH 126 and not directly to CPU 120a and CPU 120b. Similarly, In FIG. 2b a first CPU 220a is directly connected to a PCH 226, and a flash 234 is connected to the PCH 226 and not directly to CPU 220a. In FIG. 2b there are three other CPUs beside the first CPU 220a, which are CPU 220b-220d, and the four CPUs in total are connected in such a way that each CPU is directly connected to two other CPUs. In FIG. 2c a first CPU 320a is directly connected to a PCH 326, and a flash 334 is connected to the PCH 326 and not directly to CPU 320a. In FIG. 2c there are seven other CPUs beside the first CPU 320a, which are CPU 320b-320h and the eight CPUs in total are connected in such a way that each CPU is directly connected to three other CPUs.

Figure 3:
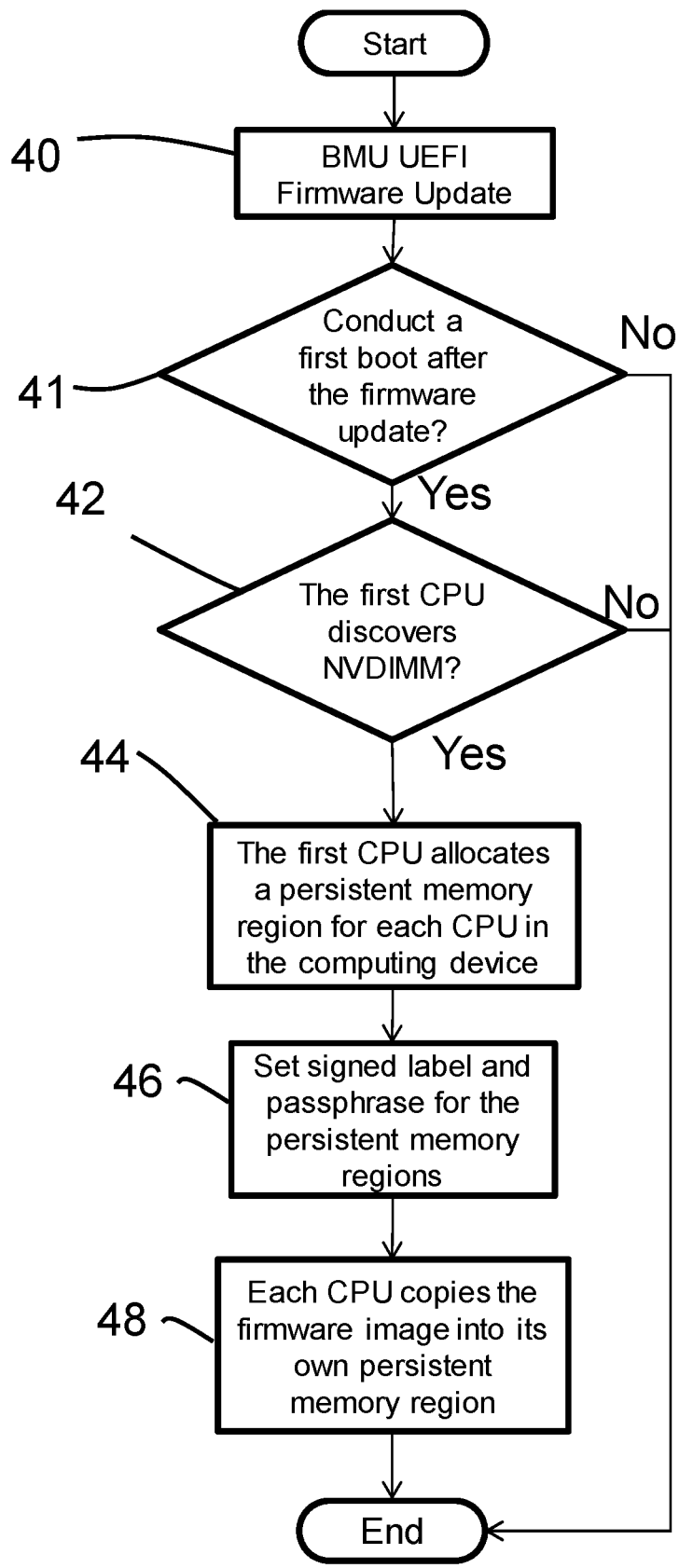
FIG. 3 is a flow chart showing method steps of creating persistent memory regions in the main memory of a computing device, according to an embodiment of the invention.

FIG. 3 shows a method of creating persistent memory regions in the main memory of an information handling apparatus for storing firmware images for the purposes of fast boot of the information handling apparatus. In particular, such a method is performed starting with a firmware update to update the UEFI firmware using Bare Metal Update (BMU) in Step 40. With the BMU update there is no need to rely on any operation system drivers or software application installed in the information handling apparatus. For example, when the information handling apparatus is performing BMU update the information handling apparatus can be booted from a bootable media (e.g. DVD, CD-ROM, external disk, etc.) and updated with its firmware. As another example, the baseboard management controller of the server updates the firmware directly using an out of bound method. After the firmware update is completed, the firmware image is written in the SPI flash chip of the information handling apparatus.

Next, depends on whether the information handling apparatus is immediately rebooted for the first time after the firmware update in Step 41, there will be different processes thereafter. If the information handling apparatus is not immediately rebooted, then the method will end. However, if the information handling apparatus is immediately rebooted, then the method then continues as the UEFI executes the subsequent steps in a first boot after the firmware update. The first CPU (e.g. CPU 120a in FIG. 2a) in the information handling apparatus discovers whether there is any Non-Volatile Dual In-Line Memory Module (NVDIMM) present in the information handling apparatus in Step 42. Note that the first CPU is able to make this check since all system memories are directly connected to and accessible by the CPUs (which have built-in memory controllers). Also, as mentioned above the first CPU is the earliest CPU to be booted before any other CPUs in the information handling apparatus. NVDIMM is a new generation of main memory type which combines the high speed of dynamic random-access memory (DRAM) and the non-volatile characteristics of NAND flash. An example of commercially available NVDIMM is the Intel® Apache Pass (AEP) memory or Intel® Otane™ DC Persistent Memory. DRAM operates at high speed but if an information handling device shuts down unexpectedly any data in DRAM is lost. NAND Flash is slower but it's nonvolatile, meaning it retains data when the power source is removed. The NVDIMM provides a latency of data access similar to that of traditional DRAM but at the same time the data is persistently stored so that it will not be lost after reboot or power shutdown.

If in Step 42 there is no NVDIMM discovered by the first CPU in the information handling apparatus, then it means that the fast boot method cannot be implemented, and the method will directly end. However, if in Step 42 there is indeed NVDIMM discovered by the first CPU in the information handling apparatus, then the method goes to Step 44 in which the first CPU allocates a persistent memory region in the NVDIMM for each of the multiple CPUs installed in multiple sockets in the information handling apparatus. The size of the persistent memory region for each CPU is 16 MB in this example. Next, in Step 46 the first CPU sets a signed label (which is associated with the information handling system's serial number) to each one of the persistent memory regions, and also sets a passphrase for the persistent memory regions. The passphrase is stored in the SPI flash chip and the passphrase is protected by Core Root of Trust for Measurement (CRTM). Finally, in Step 48 each one of the CPUs will copy the firmware image stored in the SPI flash into their respective persistent memory regions. The first boot of the information handling apparatus after the firmware update is therefore completed.

Figure 4:
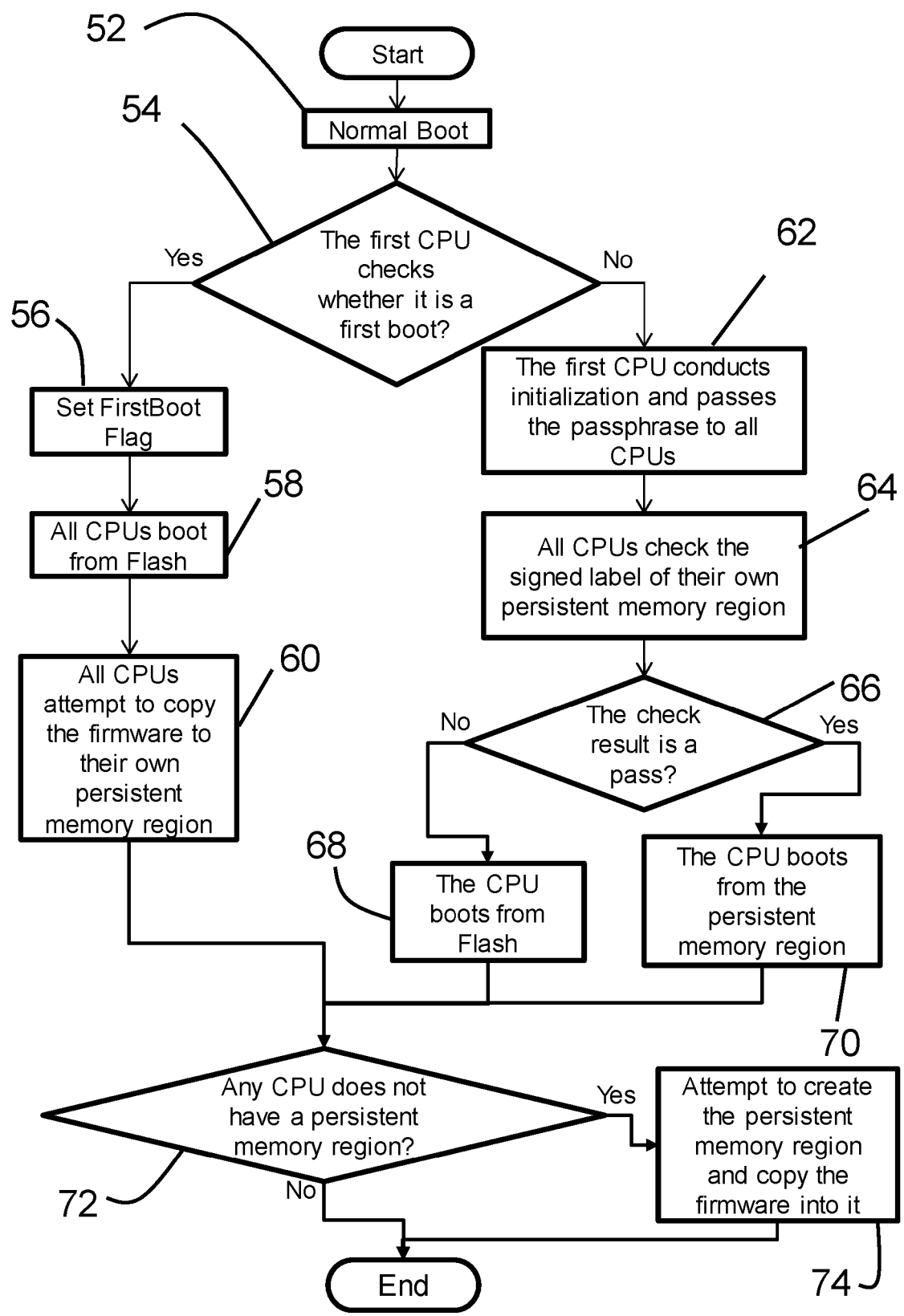
FIG. 4 is a flow chart showing method steps of normal booting a computing device with configuration of persistent memory regions for firmware images, according to an embodiment of the invention.

Turning to FIG. 4, which shows the procedures of a normal boot of an information handling system according to another embodiment of the invention. The normal boot can take place in Step 52 before any firmware update, or after any firmware update (as shown in FIG. 3). Therefore, the method shown in FIG. 4 is independent from the method shown in FIG. 3. During the normal boot, initially in Step 54 the first CPU checks whether this normal boot is in fact a first boot after a firmware update. This could be the case for example when the firmware update was completed but there is no immediate reboot of the system (for example when the method shown in FIG. 3 directly ends after Step 41). The checking in Step 54 is conducted by the first CPU after the UEFI is loaded, as the first CPU compares current UEFI Firmware information including BuildID, BuildDate, and FWVersion with those previous stored in a persistent memory region of the NVDIMM which is associated with the first CPU. If the current UEFI firmware information is different (or more recent) than the previously stored ones, then it means that there is a newer firmware version in the SPI flash since the current UEFI firmware is still an old version, and this boot is a first boot. Alternatively, if the first CPU is unable to make any such comparison because there is no stored information in a persistent memory region found, then this boot is still considered a first boot. The lack of stored information in the persistent memory region could result from no persistent memory region created previously, for example when there is no NVDIMM in the information handling apparatus.

If it is determined that the normal boot is actually a first boot in Step 54, then the first CPU will set a FirstBoot flag in the memory in Step 56. All CPUs in the information handling apparatus then boot from the SPI flash in Step 58 in a conventional manner. One example of the CPUs botting SPI flash includes the steps as follows: firstly only the first CPU (e.g. CPU 120*a* in FIG. 2*a*, CPU 220*a* in FIG. 2*b*, and CPU 320*a* in FIG. 2*c*) as well a second CPU which is directly connected to the first CPU (e.g. CPU 120*b* in FIG. 2*a*, CPUs 220*b* and 220*d* in FIG. 2*b*, and CPUs 320*b*, 320*d* and 320*h* in FIG. 2*c*) can fetch the firmware from the SPI flash to boot up. All other CPUs, if any, need to wait for the first CPU to set up the QPI/DPI link before they can fetch the firmware image from the SPI flash through the first CPU to boot up.

After all the CPUs re booted in Step 58, then in Step 60 All CPUs attempt to copy a firmware image from the SPI flash to their respective persistent memory region in the NVDIMM. Note that this may be successful or unsuccessful for each CPU because the copying action will fail if a CPU has no persistent memory region created by this time. Afterward, in Step 72 for any CPU which does not have a persistent memory region the first CPU will attempt to create one and copy the firmware update into the persistent memory region if the creation is successful in Step 74. The method will then end.

In Step 54, if it is determined that the normal boot is not a first boot, i.e. the current UEFI firmware information is no different from those as previously stored, then the method proceeds to Step 62, in which the first CPU conducts necessary initializations of the software environment and then passes the passphrase stored in the SPI flash to all other CPUs. Then, all other CPUs except the first CPU check the signed label of their persistent memory regions, if any, in Step 64 to see if signed label matches the passphrase. A check in Step 66 will followed by a boot from the persistent memory region in NVDIMM for a CPU in Step 70 if the result of the check is yes. Otherwise, if any CPU failed the check, then the CPU boots up in a conventional manner from the SPI flash in Step 68. Once all the CPUs are booted, no matter from the SPI flash or from the persistent memory region in the NVDIMM, then the method goes to Step 72 which has been described above.

By booting one or more CPU from their respective persistent memory region in the NVDIMM, including the first CPU, it will significantly reduce the total booting time of the information handling system since the NVDIMM provides an access speed faster than a NAND flash chip by several orders of magnitudes. There is always a backup booting strategy that if the persistent memory region does not contain an up-to-date firmware image, then the CPU(s) will still boot from the SPI flash.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For the example, in the embodiments mentioned above NVDIMM is described as the main memory of the information handling apparatus for creating persistent memory regions. However, the invention is not limited to implementation based on NVDIMM. Any other past or future memory type which provides a faster access speed as compared to NAND flash and also provides persistent data storage even after power off could be used to implement the present invention.

In addition, the Intel® Xeonx® processors platform is used as examples to describe the structure of information handling apparatus, and the size of the persistent memory region is described to be 16 MB. However, one skilled in the art should recognize that other types of multi-processor systems may also be applicable with the present invention. For example, the present invention may apply also to FPGA based server system which will have bigger SPI flash size (64 MB or bigger) to get better boot performance.

The invention claimed is:

1. A method for preparing fast boot of an information handling apparatus, the information handling apparatus comprising a first CPU connected to a storage device storing firmware and a second CPU connected to the first CPU; the method comprising:
   allocating, in main memory associated with the first and second CPUs, a firmware region for each one of the first CPU and the second CPU, including assigning a signed label and a passphrase for each of the firmware regions;
   passing the passphrase to the second CPU; and
   copying the firmware from the storage device to each of the firmware regions for each of the first and second CPUs.

2. The method according to claim 1, wherein the allocating the firmware regions for each one of the first CPU and the second CPU is performed by the first CPU, and wherein the storage device is a flash storage device.

3. The method according to claim 1, further comprising:
   detecting the main memory associated with the first CPU and the second CPU; and
   creating, in the main memory, the firmware region for the first CPU and the firmware region for the second CPU.

4. The method according to claim 1, wherein a size of the firmware region is one selected from a group consisting of 16 megabytes and 64 megabytes.

5. The method according to claim 1, wherein the storage device is a Serial Peripheral Interface (SPI) cache connected to a Platform Controller Hub (PCH), and wherein the first CPU is directly connected to the PCH.

6. The method according to claim 1, wherein the main memory associated with the first and second CPUs comprises a Non-Volatile Dual In-Line Memory Module (NVDIMM).

7. The method according to claim 1, wherein the passphrase for each of the firmware regions is stored in the storage device.

8. A method of booting an information handling apparatus, the information handling apparatus comprising a first CPU connected to a storage device storing firmware and a second CPU connected to the first CPU; the method comprising the steps of:
   determining whether the firmware in the storage device is stored, in main memory associated with the first and second CPUs, in a firmware region associated with each one of the first and second CPUs respectively, wherein each of the firmware regions is assigned a passphrase and a signed label;
   in response to determining that the firmware is stored in the firmware region associated with at least one of the first CPU and the second CPU, booting, based on the passphrase, at least one of the first CPU and the second CPU from their respective firmware region in the main memory associated with the first and second CPUs; and
   in response to determining that the firmware is not stored in the firmware region associated with at least one of the first CPU and the second CPU, booting at least one of the first CPU and the second CPU from the storage device and copying the firmware from the storage device to each of the firmware regions for each of the first and second CPUs.

9. The method according to claim 8, wherein step a) further comprises the steps of:
   checking whether the firmware is used for booting for a first time;
   if it is determined that the firmware is used for booting for the first time, jumping to step c);
   if it is determined that the firmware has been used for booting previously, checking, for each one of the first CPU and the second CPU, whether the firmware regions exist in the main memory associated with the first and second CPUs;
   if it is determined that the firmware regions exist in the main memory associated with the first and second CPUs, booting at least one of the first CPU and the second CPU from their respective firmware region in the main memory associated with the first and second CPUs; and
   if it is determined that there are no said firmware regions in the main memory associated with the first and second CPUs, booting at least one of the first CPU and the second CPU from the storage device, creating the firmware regions, and copying the firmware from the storage device to each of the firmware regions for each of the first and second CPUs respectively.

10. The method according to claim 8, wherein the determining step is performed by the first CPU, and wherein the storage device is a flash storage device.

11. The method according to claim 9, wherein step d) further comprises the step of comparing at least one of the following information of the firmware with that of stored information comprising any one of: build ID, build date, and version.

12. The method according to claim 9, further comprises the step of performing an initialization and passing the passphrase from the storage device to the second CPU by the first CPU, before step f).

13. The method according to claim 9, wherein the step of creating the firmware region in step h) further comprises allocating a firmware region in the main memory associated with the first and second CPUs, and assigning the signed label and the passphrase for each of the firmware regions.

14. The method according to claim 8, wherein a size of the firmware region is one selected from a group consisting of 16 megabytes and 64 megabytes.

15. The method according to claim 8, wherein the storage device is a Serial Peripheral Interface (SPI) cache connected to a Platform Controller Hub (PCH); the first CPU being directly connected to the PCH.

16. The method according to claim 8, wherein the main memory is a Non-Volatile Dual In-Line Memory Module (NVDIMM).

17. An information handling apparatus, comprising:
   a first CPU configured to connect to a storage device storing firmware;
   a second CPU connected to the first CPU;
   main memory associated with and connected with the first and second CPUs;
   wherein the first CPU is operable to allocate, in the main memory associated with the first and second CPUs, a firmware region for each of the first and second CPUs, including assigning a signed label and a passphrase for each of the firmware regions; and
   the first CPU and the second CPU further operable to copy the firmware from the storage device to each of the firmware regions for each one of the first and second CPUs respectively, and pass the passphrase to the second CPU.

* * * * *